United States Patent
Kim et al.

(10) Patent No.: US 9,786,897 B2
(45) Date of Patent: *Oct. 10, 2017

(54) ELECTRODE ASSEMBLY AND RECHARGEABLE BATTERY HAVING ELECTRODE TAB

(71) Applicant: Samsung SDI Co., Ltd., Yongin-si, Gyeonggi-do (KR)

(72) Inventors: Yu-Na Kim, Yongin-si (KR); Jang-Ho Yoon, Yongin-si (KR); San Hwang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 42 days.

This patent is subject to a terminal disclaimer.

(21) Appl. No.: 14/969,803

(22) Filed: Dec. 15, 2015

(65) Prior Publication Data

US 2016/0218343 A1 Jul. 28, 2016

(30) Foreign Application Priority Data

Jan. 28, 2015 (KR) .......... 10-2015-0013814

(51) Int. Cl.
*H01M 2/26* (2006.01)
*H01M 4/70* (2006.01)
(Continued)

(52) U.S. Cl.
CPC .......... *H01M 2/263* (2013.01); *H01M 4/70* (2013.01); *H01M 10/0409* (2013.01);
(Continued)

(58) Field of Classification Search
CPC .......... H01M 2/263; H01M 10/0409; H01M 10/0431; H01M 10/0587; H01M 4/70; H01M 10/052; H01M 10/0413
See application file for complete search history.

(56) References Cited

U.S. PATENT DOCUMENTS

| 2,187,466 A | 1/1940 | Stratford |
| 6,746,796 B2 * | 6/2004 | Watanabe .......... H01M 2/263 29/623.1 |

(Continued)

FOREIGN PATENT DOCUMENTS

| EP | 1 207 565 A2 | 5/2002 |
| JP | 2011-171079 A | 9/2011 |

OTHER PUBLICATIONS

Extended European Search Report (EESR) dated Oct. 7, 2016 for European Patent Application No. EP 16 150 338.8 which shares priority of Korean Patent Application No. KR 10-2015-0013814 with Subject U.S. Appl. No. 14/969,803.

(Continued)

*Primary Examiner* — Stewart Fraser
(74) *Attorney, Agent, or Firm* — Knobbe Martens Olson & Bear LLP (57) ABSTRACT

An electrode assembly and a secondary battery having an electrode tab are disclosed. In one aspect, the electrode assembly includes first and second electrodes which are wound with a separator placed therebetween. The first electrode includes a first coated portion, and a plurality of first electrode tabs T1-Tn not coated with an active material and protruding outwardly from the first coated portion, wherein n is greater than 2. The first electrode, when spread in a plane form, includes first to nth portions on which the first electrode tabs T1-Tn are respectively formed, wherein the first and nth portions respectively define the innermost and outermost portions thereof. The distance between the first electrode tab Tn placed at the outermost portion and the first electrode Tn−1 placed at the second outermost portion is greater than any of the distances between two adjacent ones of the other first electrode tabs T1-Tn−1.

15 Claims, 5 Drawing Sheets

(51) Int. Cl.
*H01M 10/04* (2006.01)
*H01M 10/052* (2010.01)
*H01M 10/0587* (2010.01)

(52) U.S. Cl.
CPC ..... *H01M 10/0431* (2013.01); *H01M 10/052* (2013.01); *H01M 10/0587* (2013.01); *H01M 10/0413* (2013.01)

(56) References Cited

U.S. PATENT DOCUMENTS

| | | | | |
|---|---|---|---|---|
| 8,702,818 | B2* | 4/2014 | Sohn | H01M 2/22 29/623.1 |
| 9,012,053 | B2* | 4/2015 | Chun | H01M 2/023 429/122 |
| 2009/0239133 | A1 | 9/2009 | Kosugi | |
| 2016/0218344 | A1* | 7/2016 | Kim | H01M 2/263 |
| 2016/0218345 | A1* | 7/2016 | Kim | H01M 2/263 |

OTHER PUBLICATIONS

Partial European Search Report dated May 18, 2016 for European Patent Application No. EP 16 150 338.8 which shares priority of Korean Patent Application No. KR 10-2015-0013814, filed Jan. 28, 2015, with subject U.S. Appl. No. 14/969,803.

* cited by examiner

ELECTRODE ASSEMBLY AND RECHARGEABLE BATTERY HAVING ELECTRODE TAB

INCORPORATION BY REFERENCE TO ANY PRIORITY APPLICATIONS

This application claims priority to and the benefit of Korean Patent Application No. 10-2015-0013814 filed in the Korean Intellectual Property Office on Jan. 28, 2015, the entire contents of which are incorporated herein by reference.

This application relates to U.S. patent applications entitled "ELECTRODE ASSEMBLY AND RECHARGEABLE BATTERY HAVING ELECTRODE TAB" (application Ser. No. 14/969,823) and "ELECTRODE ASSEMBLY AND RECHARGEABLE BATTERY HAVING ELECTRODE TAB" (application Ser. No. 14/969,810), which are concurrently filed on the same date as this application and incorporated herein by reference in their entirety.

BACKGROUND

Field

The described technology generally relates to an electrode assembly and a secondary battery including the electrode assembly.

Description of the Related Technology

A rechargeable (or secondary) battery can be charged and discharged multiple times, unlike a primary battery. A low-capacity rechargeable battery is used for small portable electronic devices such as a portable phone, a smartphone, a tablet computer, a notebook computer, and a camcorder. A high-capacity rechargeable battery (most often used with an array of batteries or battery cells) is widely used as a power source for driving a motor for a hybrid vehicle or an electric vehicle.

Recently, a high-output rechargeable battery using a non-aqueous electrolyte solution with high energy density has been developed. The high-output rechargeable battery is configured as a high-capacity rechargeable battery in which a plurality of rechargeable batteries are connected in series so as to be used in driving a device requiring high power, for example, a motor for an electric vehicle.

In addition, one high-capacity rechargeable battery generally includes a plurality of rechargeable batteries which are connected in series, and the rechargeable battery may have a cylindrical or angular shape. In addition, the rechargeable battery has an electrode assembly implementing charging and discharging. The electrode assembly includes a positive electrode, a negative electrode, and a separator interposed between the positive and negative electrodes. The electrode assembly is often formed with a structure in which a plurality of positive electrode plates and negative electrode plates are stacked or a structure in which band-shaped positive and negative electrodes are wound.

SUMMARY OF CERTAIN INVENTIVE ASPECTS

One inventive aspect relates to an electrode assembly and a secondary battery having an electrode tab.

Another aspect is an electrode assembly capable of being easily wound, and a rechargeable battery including the same.

Another aspect is an electrode assembly in which a first electrode and a second electrode are wound with a separator placed therebetween, wherein the first electrode includes a first coated portion coated with an active material, and a plurality of first electrode tabs not coated with an active material and protruding outward of the first coated portion, and wherein a distance between a first electrode tab Tn placed at an outermost side and a first electrode Tn−1 placed second from the outside based on the end of the inside of the first electrode is greater than distances between the other first electrode tabs.

The distances between the first electrode tabs of from the first electrode tab T1 placed at the innermost side to the first electrode tab Tn−1 placed second from the outside based on the end of the inside of the first electrode may gradually increase.

The distances between the first electrode tabs of from the first electrode tab T1 placed at the innermost side to the first electrode tab Tn−1 placed second from the outside in the electrode assembly may form an arithmetical progression having a common difference, and the difference between the distance between the first electrode tab Tn placed at the outermost side and the first electrode tab Tn−1 placed second from the outside and the previous distance may be greater than the common difference.

The common difference may be $2\pi d$ when the thickness of the electrode assembly in a spread state is given as d. The distance between the first electrode tab Tn placed at the outermost side and the first electrode Tn−1 placed second from the outside based on the end of the inside of the first electrode may be 1.5 to 4 times the largest among the distances between the other first electrode tabs.

The second electrode may include a second coated portion coated with an active material, and a plurality of second electrode tabs not coated with an active material and protruding outward of the second coated portion, and the distance between the second electrode tab Yn placed at the outermost side and the second electrode Yn−1 placed second based on the end of the inside of the second electrode may be greater than the distances between the other second electrode tabs.

The distances between the second electrode tabs of from the second electrode tab Y1 placed at the innermost side to the second electrode tab Yn−1 placed second from the outside based on the end of the inside of the second electrode may gradually increase.

Another aspect is a rechargeable battery, including: an electrode assembly in which a first electrode and a second electrode are wound with a separator placed therebetween; a case containing the electrode assembly; and a cam plate combined with the case, wherein the first electrode includes a first coated portion coated with an active material, and a plurality of first electrode tabs not coated with an active material and protruding outward of the first coated portion, and wherein a distance between a first electrode tab Tn placed at the outermost side and a first electrode Tn−1 placed second from the outside based on the end of the inside of the first electrode is greater than distances between the other first electrode tabs T1-Tn−1.

The distances between the first electrode tabs of from the first electrode tab T1 placed at the innermost side to the first electrode tab Tn−1 placed second from the outside based on the end of the inside of the first electrode may gradually increase.

The distances between the first electrode tabs of from the first electrode tab T1 placed at the innermost side to the first electrode tab Tn−1 placed second from the outside in the electrode assembly may form an arithmetical progression having a common difference, and the difference between the distance between the first electrode tab Tn placed at the outermost side and the first electrode tab Tn−1 placed second from the outside and the previous distance may be greater than the common difference. The common difference may be $2\pi d$ when the thickness of the electrode assembly in a spread state is given as d.

The distance between the first electrode tab Tn placed at the outermost side and the first electrode Tn−1 placed second from the outside based on the end of the inside of the first electrode may be 1.5 to 4 times the greatest among the distances between the other first electrode tabs.

The second electrode may include a second coated portion coated with an active material, and a plurality of second electrode tabs not coated with an active material and protruding outward of the second coated portion, and the distance between the second electrode tab Yn placed at the outermost side and the second electrode Yn−1 placed second based on the end of the inside of the second electrode may be greater than the distances between the other second electrode tabs.

The distances between the second electrode tabs of from the second electrode tab Y1 placed at the innermost side to the second electrode tab Yn−1 placed second from the outside based on the end of the inside of the second electrode may gradually increase.

The cap plate may have a first terminal electrically connected with the first electrode, and a connection terminal formed in a pillar shape being fitted into the first terminal. The first terminal may be electrically connected with the first electrode via a first current collecting member, the first current collecting member including an upper plate bonded to the connection terminal and an electrode attachment portion bent from the upper plate toward the electrode assembly to be bonded to the first electrode tab.

Another aspect is an electrode assembly for a secondary battery, comprising: a first electrode and a second electrode which are wound with a separator placed therebetween, wherein the first electrode includes a first coated portion coated with an active material, and a plurality of first electrode tabs T1-Tn not coated with an active material and protruding outwardly from the first coated portion, wherein n is a natural number greater than 2, and wherein the first electrode, when spread in a plane form, includes first to nth portions on which the first electrode tabs T1-Tn are respectively formed, wherein the first and nth portions of the first electrode respectively define the innermost and outermost portions thereof, wherein the distance between the first electrode tab Tn placed at the outermost portion and the first electrode Tn−1 placed at the second outermost portion of the first electrode is greater than any of the distances between two adjacent ones of the other first electrode tabs T1-Tn−1.

In the above electrode assembly, the distances between two adjacent ones of the first electrode tabs gradually increase from the innermost portion to the second outermost portion of the first electrode. In the above electrode assembly, the distances between two adjacent ones of the first electrode tabs T1-Tn−1 form an arithmetical progression having a common difference. In the above electrode assembly, the common difference is $2\pi d$ when the thickness of the electrode assembly in a spread state is represented by d. In the above electrode assembly, the distance between the first electrode tab Tn placed at the outermost portion and the first electrode tab Tn−1 placed at the second outermost portion of the first electrode is about 1.5 times to about 4 times the greatest of the distances between two adjacent ones of the other first electrode tabs T1-Tn−1.

In the above electrode assembly, the second electrode includes a second coated portion coated with an active material, and a plurality of second electrode tabs Y1-Yn not coated with an active material and protruding outwardly from the second coated portion, and wherein the second electrode, when spread in a plane form, includes first to nth portions on which the second electrode tabs Y1-Yn are respectively formed, wherein n is a natural number greater than 2, wherein the first and nth portions of the second electrode respectively define the innermost and outermost portions thereof, wherein the distance between the second electrode tab Yn placed at the outermost portion and the second electrode Yn−1 placed at the second outermost portion of the second electrode is greater than any of the distances between two adjacent ones of the other second electrode tabs Y1-Yn−1. In the above electrode assembly, the distances between adjacent ones of the second electrode tabs Y1-Yn−1 gradually increase from the innermost portion to the second outermost portion of the second electrode.

Another aspect is a rechargeable battery, comprising: an electrode assembly including a first electrode and a second electrode wound with a separator placed therebetween; a case containing the electrode assembly; and a cap plate combined with the case, wherein the first electrode includes a first coated portion coated with an active material, and a plurality of first electrode tabs T1-Tn not coated with an active material and protruding outwardly from the first coated portion, wherein n is a natural number greater than 2, and wherein the first electrode, when spread in a plane form, includes first to nth portions on which the first electrode tabs T1-Tn are respectively formed, wherein the first and nth portions of the first electrode respectively define the innermost and outermost portions thereof, wherein the distance between the first electrode tab Tn placed at the outermost portion and the first electrode Tn−1 placed at the second outermost portion of the first electrode is greater than any of the distances between two adjacent ones of the other first electrode tabs T1-Tn−1.

In the above battery, the distances between two adjacent ones of the first electrode tabs T1-Tn−1 gradually increase from the innermost portion to the second outermost portion of the first electrode. In the above battery, the distances between two adjacent ones of the first electrode tabs T1-Tn−1 have a common difference. In the above battery, the common difference is $2\pi d$ when the thickness of the electrode assembly in a spread state is represented by d. In the above battery, the distance between the first electrode tab Tn placed at the outermost portion and the first electrode tab Tn−1 placed at the second outermost portion of the first electrode is about 1.5 times to about 4 times the greatest of the distances between two adjacent ones of the other first electrode tabs T1-Tn−1.

In the above battery, the second electrode includes a second coated portion coated with an active material, and a plurality of second electrode tabs not coated with an active material and protruding outwardly from the second coated portion, and wherein the second electrode, when spread in a plane form, includes first to nth portions on which the second electrode tabs Y1-Yn are respectively formed, wherein the first and nth portions of the second electrode respectively define the innermost and outermost portions thereof, wherein the distance between the first electrode tab Yn placed at the outermost portion and the first electrode Yn−1 placed at the second outermost portion of the second electrode is greater than any of the distances between two adjacent ones of the other first electrode tabs Y1-Yn−1.

In the above battery, the distances between adjacent ones of the second electrode tabs gradually increase from the innermost portion to the second outermost portion of the second electrode. In the above battery, a first terminal electrically connected to the first electrode is installed on the cap plate, a connection terminal formed in a pillar shape being fitted into the first terminal, and wherein the first terminal is electrically connected to the first electrode via a first current collecting member, the first current collecting member including an upper plate bonded to the connection terminal and an electrode attachment portion bent from the upper plate toward the electrode assembly to be bonded to the first electrode tab. In the above battery, the battery is configured to drive a motor to start a vehicle.

Another aspect is an electrode assembly for a secondary battery, comprising: a first electrode and a second electrode; a separator placed between the first and second electrodes; and a plurality of first electrode tabs T1-Tn outwardly extending from the first electrode, wherein n is a natural number greater than 2, wherein the first electrode includes first to nth portions on which the first electrode tabs T1-Tn are respectively formed, wherein the first and nth portions of the first electrode respectively define innermost and outermost portions thereof, wherein the distance between the first electrode tab Tn placed at the outermost portion and the first electrode Tn-1 placed at the second outermost portion of the first electrode is greater than any of the distances between two adjacent ones of the other first electrode tabs T1-Tn-1.

In the above electrode assembly, the distances between two adjacent ones of the first electrode tabs gradually increase from the innermost portion to the second outermost portion of the first electrode. In the above electrode assembly, the distances between two adjacent ones of the first electrode tabs T1-Tn-1 form an arithmetical progression having a common difference. In the above electrode assembly, the distance between the first electrode tab Tn placed at the outermost portion and the first electrode tab Tn-1 placed at the second outermost portion of the first electrode is about 1.5 times to about 4 times the greatest of the distances between two adjacent ones of the other first electrode tabs T1-Tn-1.

According to at least one of the disclosed embodiments, the point at which the winding of the electrode assembly is ended can be easily detected using the electrode tab placed at the outermost side of the electrode assembly.

DETAILED DESCRIPTION OF CERTAIN INVENTIVE EMBODIMENTS

Generally, in a secondary battery, it is important to align protruding electrode tabs when a positive electrode, a negative electrode, and a separator are stacked and wound, and thus, the start and end points of the winding need to be accurately checked during manufacture.

Embodiments will be described more fully hereinafter with reference to the accompanying drawings, in which exemplary embodiments are shown. However, the present invention may be embodied in many different forms, and is not limited to the exemplary embodiments described herein. In addition, like reference numerals refer to like elements throughout the specification and drawings. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Figure 1:
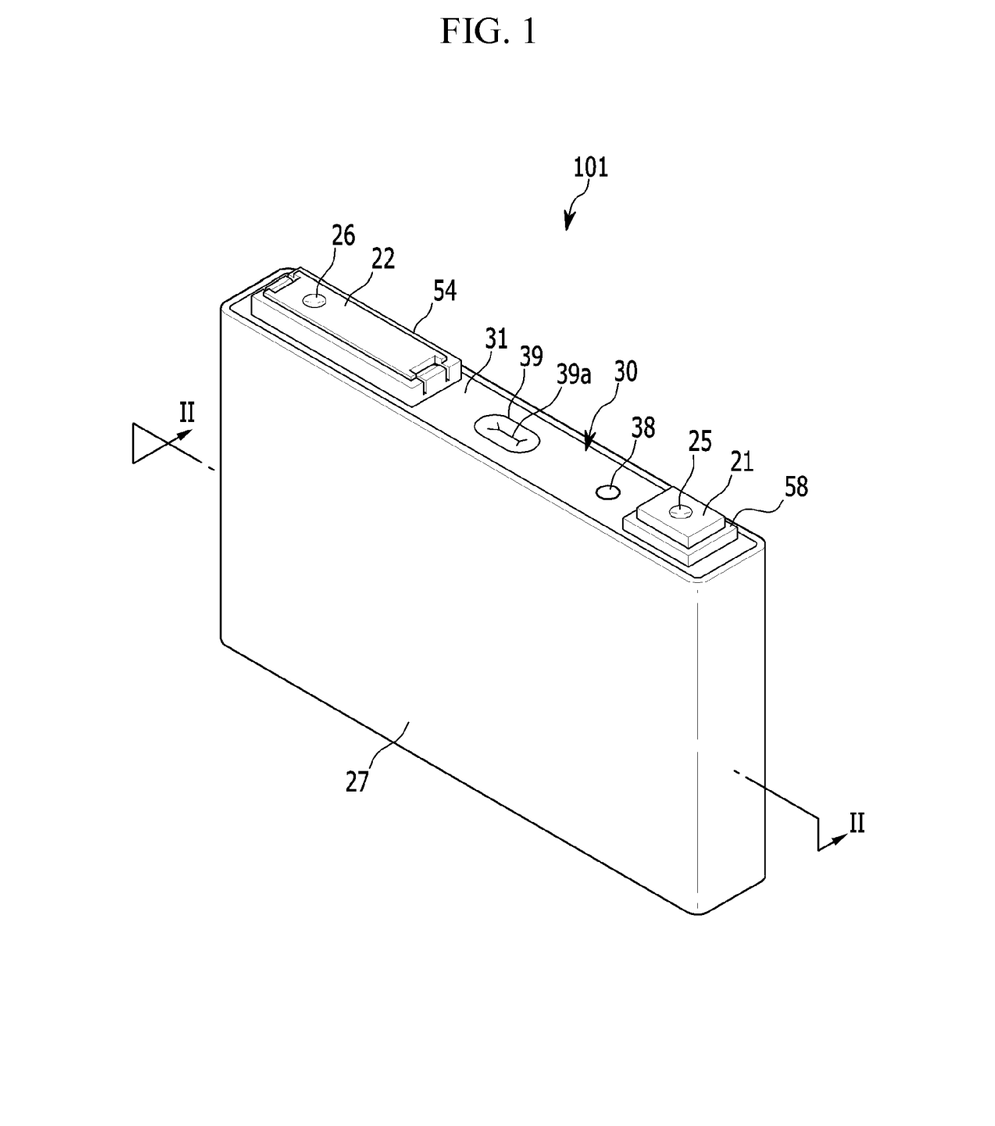
FIG. 1 is a perspective view showing a rechargeable battery according to a first embodiment.
Figure 2:
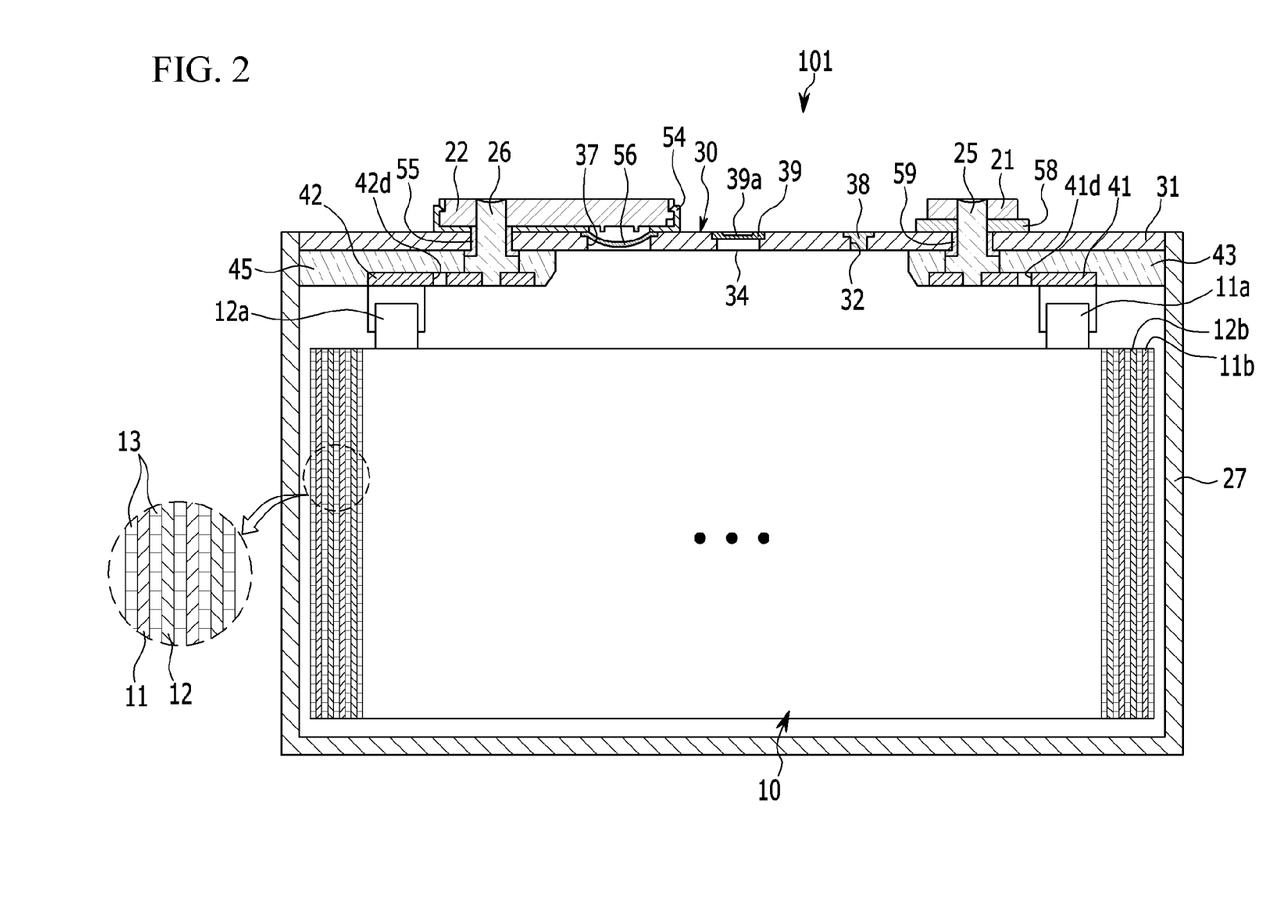
FIG. 2 is a cross-sectional view taken along line H-H in FIG. 1.

FIG. 1 is a perspective view showing a rechargeable battery 101 according to an embodiment, and FIG. 2 is a cross-sectional view taken along line II-II in FIG. 2.

Referring to FIGS. 1 and 2, the rechargeable battery 101 includes an electrode assembly 10 in which a positive electrode (first electrode) 11 and a negative electrode (second electrode) 12 are wound with a separator 13 interposed therebetween, a case 27 containing the electrode assembly 10, and a cap assembly 30 connected to an opening of the case 27.

The rechargeable battery 101 will be described by exemplifying a lithium ion rechargeable battery with an angular shape. However, the present invention is not limited thereto, and may be applied to various types of batteries, such as a lithium polymer battery or a cylindrical shaped battery. In addition, the rechargeable battery 101 can be a high-output rectangular shaped battery, and may be formed as, particularly, a battery for powering a motor used to start a vehicle. Since such battery requires momentary high power, a structure in which electrode tabs protrude upward is favorable, as in the present embodiment. However, it is very difficult to accurately align electrode tabs in cases of the structure in which the electrode tabs protrude upwardly. In order to accurately align the electrode tabs, a point at which winding is started and a point at which the winding is ended need to be accurately specified, and thus the electrode tabs can be accurately stacked without missing each other.

The case 27 can have a substantially cuboid shape, and an opening is formed in one surface thereof. The case 27 may be formed of a metal, such as aluminum or stainless steel.

The cap assembly 30 includes a cap plate 31 covering the opening of the case 27, a first terminal 21 protruding outwardly from the cap plate 31 and electrically connected to the positive electrode 11, and a second terminal 22 protruding outwardly from the cap plate 31 and electrically connected to the negative electrode 12.

The cap plate 31 can have a long plate shape that is lengthened in one direction, and is connected to the opening of the case 27. The cap plate 31 is equipped with a sealing stopper 38, which is installed at an electrolyte inlet 32, and a vent plate 34, which is installed at a vent hole 39 and has a notch 39a which can be opened at a predetermined pressure. The first and second terminals 21 and 22 are installed on the cap plate 31.

The first terminal 21 is electrically connected to the positive electrode 11 via a first current collecting member 41, and the second terminal 22 is electrically connected to the negative electrode 12 via a second current collecting member 42. However, the present invention is not limited thereto, and the first terminal 21 may be electrically connected to the negative electrode and the second terminal 22 may be electrically connected to the positive electrode.

The first terminal 21 can have a rectangular plate shape. The first terminal 21 is electrically connected to the positive electrode 11 via a connection terminal 25 bonded to the first current collecting member 41. The connection terminal 25 can have a pillar shape, and can be attached to the first terminal 21 by welding while an upper end of the connection terminal 25 is fitted into the first terminal 21. In addition, the upper end of the connection terminal 25 can be attached to the first current collecting member 41 by welding, and the first current collecting member 41 electrically connects the connection terminal 25 and the positive electrode 11.

A sealing gasket 59 is inserted into a hole through which the terminal passes, between the first terminal 21 and the cap plate 31, and a lower insulation member 43 supporting the first current collecting member 41 is formed below the cap plate 31.

A connection member 58 electrically connecting the first terminal 21 and the cap plate 31 is formed below the first terminal 21. Hence, the cap plate 31 and the case 27 are positively charged.

The second terminal 22 can have a rectangular plate shape. The second terminal 22 is electrically connected to the negative electrode 12 via a connection terminal 26 bonded to the second current collecting member 42. An upper end of the connection terminal 26 is attached to the second terminal 22 while passing through the first cap plate 31 and the second terminal 22.

The connection terminal 26 can have a pillar shape, and can be attached to the second terminal 22 while an upper end of the connection terminal 26 is fitted into the second terminal 22. In addition, the upper end of the connection terminal 26 can be attached to the second current collecting member 42 by welding, and the second current collecting member 42 electrically connects the connection terminal 26 and the negative electrode 12.

A sealing gasket 55 is inserted into a hole through which the connection terminal 26 passes, between the second terminal 22 and the cap plate 31, and a lower insulation member 45 for insulating the second current collecting member 42 and the second terminal 22 from each other by the cap plate 31 is formed below the cap plate 31.

Meanwhile, a short circuit protrusion protruding toward a short circuit hole 37 is formed on a lower portion of the second terminal 22. The second terminal 22 is extended in one direction to cover the short circuit hole 37. An upper insulation member 54 electrically insulating the second terminal 22 and the cap plate 31 is formed between the second terminal 22 and the cap plate 31.

The cap assembly 30 includes a short circuit member 56 for short circuiting the positive electrode 11 and the negative electrode 12, the short circuit member 56 is electrically connected to the cap plate 31, and is transformed to be connected to the second terminal 22 when the inner pressure of the rechargeable battery 101 rises.

The cap plate 31 has the short circuit hole 37, and the short circuit member 56 is placed between the upper insulation member 54 and the cap plate 31 in the short circuit hole 37. In addition, the second terminal 22 is placed in the short circuit hole 37 to cover the short circuit hole 37. The short circuit member 56 includes a curved portion which is bent in an arc shape to be convex downward, and an edge portion formed outside the curved portion and fixed to the cap plate 31.

When a gas is generated due to an abnormal reaction inside the secondary rechargeable battery, the inner pressure of the secondary rechargeable battery rises. When the inner pressure of the secondary rechargeable battery is higher than the predetermined pressure, the curved portion is transformed to be convex upward, and the short circuit protrusion and the short circuit member 56 are touched to cause a short circuit.

Figure 3:
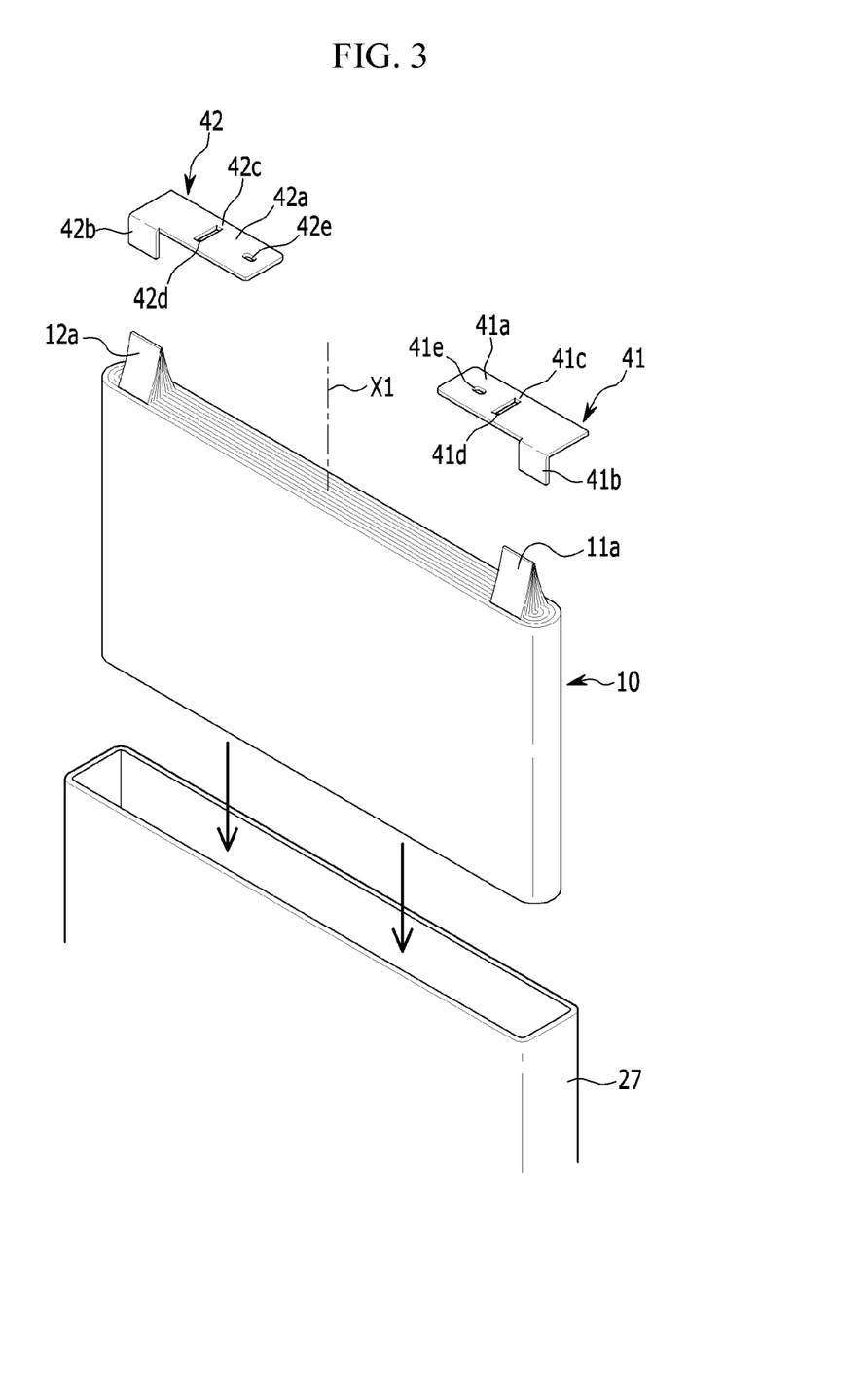
FIG. 3 is an exploded perspective view showing a part of the rechargeable battery according to the first embodiment.

FIG. 3 is an exploded perspective view showing a part of a rechargeable battery according to an embodiment. Referring to FIGS. 2 and 3, the electrode assembly 10 includes a positive electrode 11, a negative electrode 12, and a separator 13 placed between the positive electrode 11 and the negative electrode 12, which have a band shape, and has a wound structure. The electrode assembly 10 is wound around a winding axis (x1) while the separator 13 is interposed between the positive and negative electrodes 11 and 12, and then pressed to be flattened. The electrode assembly 10 includes one positive electrode 11, one negative electrode 12, and two separators 13.

The positive electrode 11 includes a positive electrode current collector, and a positive electrode active material layer coated on the positive electrode current collector. The positive electrode current collector may be formed of a metal thin plate of aluminum or the like, and the positive electrode active material layer may be formed of a lithium-based oxide. The negative electrode 12 includes a negative electrode current collector, and a negative electrode active material layer coated on the negative electrode current collector. The negative electrode current collector may be formed of a metal thin plate of copper or the like, and the negative electrode active material layer may be formed of a carbon-based active material. The separator 13 can be formed as a porous thin film, and may be formed of a polyolefin-based resin.

A first non-coated portion 11a and a second non-coated portion 12a are formed on the electrode assembly 10 to protrude toward the cap plate. The first and second non-coated portions 11a and 12a are spaced apart from each other in a width direction of the electrode assembly 10.

The first current collecting member 41 includes an upper plate 41a bonded to the connection terminal 25, and an electrode attachment portion 41b bent toward the electrode assembly 10 and bonded to the first non-coated portion 11a. The electrode attachment portion 41b is bent from an end in a width direction of the upper plate 41a to be substantially parallel with the electrode assembly 10.

In some embodiments, the upper plate 41a has a quadrangular plate shape, and is fixed to a lower portion of the connection terminal 25 by welding. The upper plate 41a has a coupling hole 41e, and the connection terminal 25 and the upper plate 41a can be welded together while a protrusion formed on a lower portion of the connection terminal 25 is fitted into the coupling hole 41e.

The upper plate 41a includes a fuse 41c having a smaller cross-sectional area compared with the periphery. A fuse hole 41d is formed in the fuse 41c, and thus the fuse 41c has a smaller vertical cross-sectional area compared with the periphery. The fuse hole 41d can be formed in substantially the center of the fuse 41c, and the fuse 41c is formed on both sides of the fuse hole 41d.

The second current collecting member 42 includes an upper plate 42a bonded to the connection terminal 26, and an electrode attachment portion 42b bent toward the electrode assembly 10 and bonded to the second non-coated portion 12a. The electrode attachment portion 42b is bent from an end in a width direction of the upper plate 42a to be parallel with the electrode assembly 10.

In some embodiments, the upper plate 42a has a quadrangular plate shape, and is fixed to a lower portion of the connection terminal 26 by welding. The upper plate 42a has a coupling hole 42e, and the connection terminal 26 and the upper plate 42a can be welded together while a protrusion formed on a lower portion of the connection terminal 26 is fitted in the coupling hole 42e.

The upper plate 42a includes a fuse 42c having a smaller cross-sectional area compared with the periphery. A fuse hole 42d is formed in the fuse 42c, and thus the fuse 42c has a smaller vertical cross-sectional area compared with the periphery. The fuse hole 42d can be formed in substantially the center of the fuse 42c, and the fuse 42c is formed on both sides of the fuse hole 42d.

The positive electrode 11 includes a first coated portion 11b coated with a positive electrode active material, and a first non-coated portion 11a without a positive electrode active material. The first non-coated portion 11a includes a plurality of first electrode tabs that are stacked. In addition, the negative electrode 12 includes a second coated portion 12b coated with a negative electrode active material, and a second non-coated portion 12a without a negative electrode active material. The second non-coated portion 12a includes a plurality of second electrode tabs that are stacked.

Figure 4:
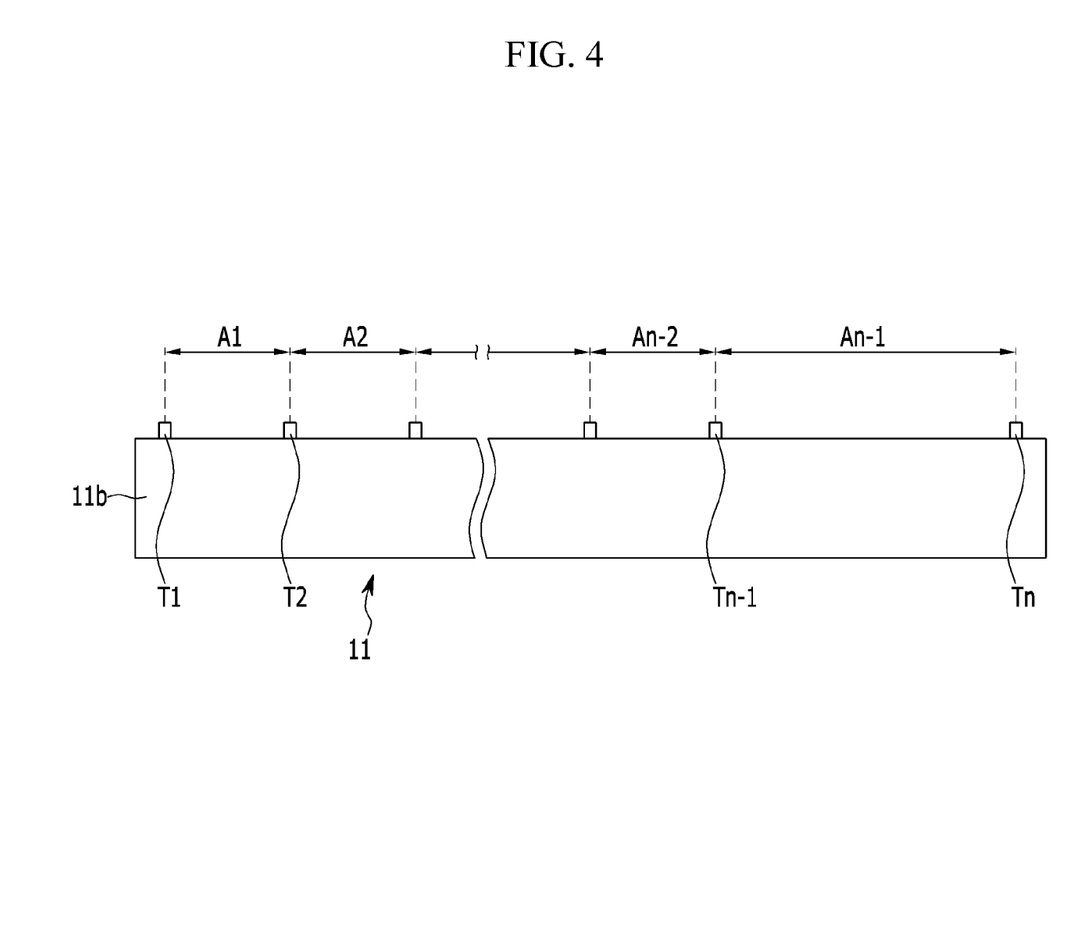
FIG. 4 is a developed plane view of a positive electrode according to the first embodiment.

FIG. 4 is a developed plane view of a positive electrode according to the first embodiment.

Referring to FIG. 4, the positive electrode 11 includes a plurality of first electrode tabs T1-Tn which protrude upward from the first coated portion 11b.

The first electrode tabs T1-Tn are spaced apart from each other in a length direction of the positive electrode 11, and the distances A1-An−1 between the first electrode tabs T1-Tn can gradually increase from the innermost portion (or innermost side) to the outermost portion (or outermost side) of the positive electrode. In the present disclosure, the distances A1-An−1 between the first electrode tabs T1-Tn−1 refer to spaced distances in a length direction of the positive electrode 11 and distances between the centers of neighboring first electrodes T1-Tn.

Thus, the distance A1 between the first electrode tab T1 placed at the innermost portion and the first electrode tab T2 placed at the second innermost portion of the positive electrode 11 is less than the distance A2 between the first electrode tab T2 and the first electrode tab T3 placed at the third innermost portion of the positive electrode 11.

The distances between adjacent ones of the first electrode tabs T1-Tn−1 can form an arithmetical progression having a common difference. However, the distances between the first electrode tabs from the first electrode T1 placed at the innermost side to the first electrode tab Tn−1 placed at the second outermost portion can form an arithmetical progression, but the distance between the first electrode tab Tn placed at the outermost side and the first electrode tab Tn−1 may not pertain to the arithmetical progression. For example, the difference between the distance An−1 between the first electrode tab Tn placed at the outermost side and the first electrode tab Tn−1 and the previous distance An−2 can be greater than the common difference.

Among the first electrode tabs from the first electrode tab T1 placed at the innermost side to the first electrode tab Tn−1 placed second from the outside, the distance between the x-th first electrode tab and the previous first electrode tab may be represented by $2\pi(r+(x-1)d)$. Here, r is the radius of an innermost circle constituting the positive electrode 11, and d is the thickness of the electrode assembly 10.

Here, the thickness of the electrode assembly 10 refers to the thickness of the electrode assembly that is spread without being wound, and the sum of thickness values of the positive electrode 11, the negative electrode 12, and two separators 13. Therefore, the common difference of the arithmetical progression is $2\pi d$.

The distance An−1 between the first electrode tabs Tn and Tn−1 can be greater than any of the distances A1-An−2 between adjacent ones of the other first electrode tabs T1-Tn−1. The distance An−1 can be about 1.5 times to about 4 times the greatest of the distances between adjacent ones of the other first electrode tabs T1-Tn−1. However, depending on the embodiments, the distance An−1 can be less than about 1.5 times the above greatest distance, as long as it is greater than the common difference. Furthermore, depending on the embodiments, the distance An−1 can be greater than about 4 times the above greatest distance.

Since the distance between the two outermost electrode tabs Tn and Tn−1 is greater than any other distance, the winding apparatus can recognize the first electrode tab Tn to accurately specify the position at which the winding is to be ended. That is, the winding apparatus may measure the distances between the first electrode tabs T1-Tn using a photosensor or the like. If the distance between electrode tabs is determined to suddenly increase, the winding apparatus may determine the sensed first electrode tab Tn as being a tab placed at the outermost side and thus specify the position at which the winding is to be ended. Therefore, the winding of one electrode assembly 10 can be promptly ended, and the winding of another electrode assembly 10 can be started at the accurate position.

Figure 5:
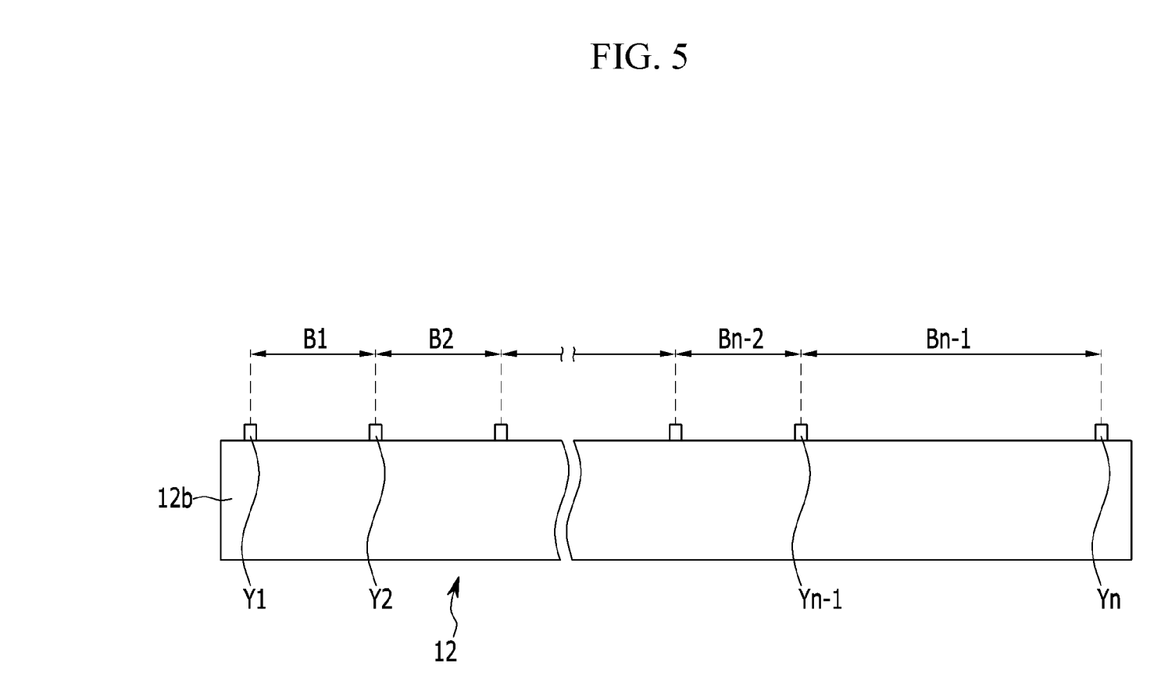
FIG. 5 is a developed plane view of a negative electrode according to the first embodiment.

FIG. 5 is a developed plane view of a negative electrode according to the first embodiment.

Referring to FIG. 5, the negative electrode 12 includes a plurality of second electrode tabs S1-Sn which protrude upwardly from the second coated portion 12b.

The second electrode tabs S1-Sn are spaced apart from each other in a length direction of the negative electrode 12, and the distances B1-Bn−1 between the second electrode tabs S1-Sn gradually increase from the innermost portion (or innermost side) to the outermost portion (or outermost side) of the negative electrode. In the present disclosure, the distances B1-Bn−1 between the second electrode tabs S1-Sn−1 refer to spaced distances in a length direction of the negative electrode 12 and distances between the centers of neighboring second electrodes S1-Sn.

Thus, the distance B1 between the second electrode tab S1 placed at the innermost portion and the second electrode tab S2 placed at the second innermost portion is less than the distance B2 between the second electrode tab S2 and the second electrode tab S3 placed at the third innermost portion of the negative electrode.

The distances between the second electrode tabs S1-Sn−1 can form an arithmetical progression having a common difference. However, the distances between the second electrode tabs from the second electrode S1 placed at the innermost side to the second electrode tab Sn−1 placed second from the outside can form an arithmetical progression, but the distance between the second electrode tab Sn and the second electrode tab Sn−1 may not pertain to the arithmetical progression. The difference between the distance Bn−1 and the previous distance Bn−2 can be greater than the common difference.

Among the second electrode tabs from the second electrode tab S1 placed at the innermost side to the second electrode tab Sn−1 placed at the second outermost portion, the distance between the x-th second electrode tab and the previous second electrode tab may be represented by $2\pi(r+(x-1)d)$. Here, r is the radius of an innermost circle constituting the negative electrode 12, and d is the thickness of the electrode assembly 10.

Here, the thickness of the electrode assembly 10 refers to the thickness of the electrode assembly that is spread without being wound, and the sum of thickness values of the positive electrode 11, the negative electrode 12, and two separators 13. Therefore, the common difference of the arithmetical progression is 2πd.

The distance Bn-1 can be greater any of the distances B1-Bn-2 between adjacent ones of the other second electrodes S1-Sn-1. The distance between the second electrode tab Sn and the second electrode tab Sn-1 may be about 1.5 times to about 4 times the greatest of the distances between adjacent ones of the other second electrode tabs S1-Sn-1. However, depending on the embodiments, the distance Bn-1 can be less than about 1.5 times the above greatest distance, as long as it is greater than the common difference. Furthermore, depending on the embodiments, the distance Bn-1 can be greater than about 4 times the above greatest distance.

Since the distance between the two outermost electrode tabs Sn and Sn-1 is greater than any other distance, the winding apparatus can recognize the second electrode tab Sn placed at the outermost side to accurately specify the position at which the winding is to be ended. That is, the winding apparatus may measure the distances between the second electrode tabs S1-Sn using a photo-sensor or the like. If the distance between electrode tabs is determined to suddenly increase, the winding apparatus may determine the sensed second electrode tab Sn as being a tab placed at the outermost side and thus specify the position at which the winding is to be ended. Therefore, the winding of one electrode assembly 10 can be promptly ended, and the winding of another electrode assembly 10 can be started at the accurate position.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode assembly for a secondary battery, comprising:
    a first electrode and a second electrode which are wound with a separator placed therebetween, wherein the first electrode includes a first coated portion coated with an active material, and a plurality of first electrode tabs T1-Tn not coated with an active material and protruding outwardly from the first coated portion, wherein n is a natural number greater than 2, and
    wherein the first electrode, when spread in a plane form, includes first to nth portions on which the first electrode tabs T1-Tn are respectively formed, wherein the first and nth portions of the first electrode respectively define the innermost and outermost portions thereof, wherein the distance between the first electrode tab Tn placed at the outermost portion and the first electrode tab Tn-1 placed at a second outermost portion of the first electrode is greater than any of the distances between two adjacent ones of the other first electrode tabs T1-Tn-1,
    wherein the distances between two adjacent ones of the other first electrode tabs T1-Tn-1 gradually increase from the innermost portion to the second outermost portion of the first electrode to form an arithmetical progression having a common difference, wherein the distance between the first electrode tab Tn-2 placed at a third outermost portion of the first electrode and the first electrode tab Tn-1 placed at the second outermost portion of the first electrode is defined as (An-2), wherein the distance between the first electrode tab Tn-1 placed at the second outermost portion of the first electrode and the first electrode tab Tn placed at the outermost portion of the first electrode is defined as (An-1), and wherein the difference between the distance (An-2) and the distance (An-1) is greater than the common difference.

2. The electrode assembly of claim 1, wherein the common difference is 2πd when the thickness of the electrode assembly in a spread state is represented by d.

3. The electrode assembly of claim 1, wherein the distance (An-1) is about 1.5 times to about 4 times the greatest of the distances between two adjacent ones of the other first electrode tabs T1-Tn-1.

4. The electrode assembly of claim 1, wherein the second electrode includes a second coated portion coated with an active material, and a plurality of second electrode tabs Y1-Yn not coated with an active material and protruding outwardly from the second coated portion, and
    wherein the second electrode, when spread in a plane form, includes first to nth portions on which the second electrode tabs Y1-Yn are respectively formed, wherein n is a natural number greater than 2, wherein the first and nth portions of the second electrode respectively define the innermost and outermost portions thereof, wherein the distance between the second electrode tab Yn placed at the outermost portion and the second electrode Yn-1 placed at the second outermost portion of the second electrode is greater than any of the distances between two adjacent ones of the other second electrode tabs Y1-Yn-1.

5. The electrode assembly of claim 4, wherein the distances between adjacent ones of the second electrode tabs Y1-Yn-1 gradually increase from the innermost portion to the second outermost portion of the second electrode.

6. The electrode assembly of claim 1, wherein the widths of all of the first electrode tabs are the same.

7. A rechargeable battery, comprising:
    an electrode assembly including a first electrode and a second electrode wound with a separator placed therebetween;
    a case containing the electrode assembly; and
    a cap plate combined with the case,
    wherein the first electrode includes a first coated portion coated with an active material, and a plurality of first electrode tabs T1-Tn not coated with an active material and protruding outwardly from the first coated portion, wherein n is a natural number greater than 2, and
    wherein the first electrode, when spread in a plane form, includes first to nth portions on which the first electrode tabs T1-Tn are respectively formed, wherein the first and nth portions of the first electrode respectively define the innermost and outermost portions thereof, wherein the distance between the first electrode tab Tn placed at the outermost portion and the first electrode Tn-1 placed at tea second outermost portion of the first electrode is greater than any of the distances between two adjacent ones of the other first electrode tabs T1-Tn-1,
    wherein the distances between two adjacent ones of the other first electrode tabs T1-Tn-1 gradually increase from the innermost portion to the second outermost portion of the first electrode to form an arithmetical progression having a common difference, wherein the distance between the first electrode tab Tn-2 placed at a third outermost portion of the first electrode and the first electrode tab Tn-1 placed at the second outermost portion of the first electrode is defined as (An-2), wherein the distance between the first electrode tab Tn−1 placed at the second outermost portion of the first electrode and the first electrode tab Tn placed at the outermost portion of the first electrode is defined as (An−1), and wherein the difference between the distance (An−2) and the distance (An−1) is greater than the common difference.

8. The rechargeable battery of claim 7, wherein the common difference is $2\pi d$ when the thickness of the electrode assembly in a spread state is represented by d.

9. The rechargeable battery of claim 7, wherein the distance (An−1) is about 1.5 times to about 4 times the greatest of the distances between two adjacent ones of the other first electrode tabs T1-Tn−1.

10. The rechargeable battery of claim 9, wherein the second electrode includes a second coated portion coated with an active material, and a plurality of second electrode tabs not coated with an active material and protruding outwardly from the second coated portion, and
wherein the second electrode, when spread in a plane form, includes first to nth portions on which the second electrode tabs Y1-Yn are respectively formed, wherein the first and nth portions of the second electrode respectively define the innermost and outermost portions thereof, wherein the distance between the first electrode tab Yn placed at the outermost portion and the first electrode Yn−1 placed at the second outermost portion of the second electrode is greater than any of the distances between two adjacent ones of the other first electrode tabs Y1-Yn−1.

11. The rechargeable battery of claim 10, wherein the distances between adjacent ones of the second electrode tabs gradually increase from the innermost portion to the second outermost portion of the second electrode.

12. The rechargeable battery of claim 7, wherein a first terminal electrically connected to the first electrode is installed on the cap plate, a connection terminal formed in a pillar shape being fitted into the first terminal, and
wherein the first terminal is electrically connected to the first electrode via a first current collecting member, the first current collecting member including an upper plate bonded to the connection terminal and an electrode attachment portion bent from the upper plate toward the electrode assembly to be bonded to the first electrode tab.

13. The rechargeable battery of claim 7, wherein the battery is configured to drive a motor to start a vehicle.

14. An electrode assembly for a secondary battery, comprising:
a first electrode and a second electrode;
a separator placed between the first and second electrodes; and
a plurality of first electrode tabs T1-Tn outwardly extending from the first electrode,
wherein n is a natural number greater than 2,
wherein the first electrode includes first to nth portions on which the first electrode tabs T1-Tn are respectively formed, wherein the first and nth portions of the first electrode respectively define innermost and outermost portions thereof, wherein the distance between the first electrode tab Tn placed at the outermost portion and the first electrode Tn−1 placed at a second outermost portion of the first electrode is greater than any of the distances between two adjacent ones of the other first electrode tabs T1-Tn−1,
wherein the distances between two adjacent ones of the other first electrode tabs T1-Tn−1 gradually increase from the innermost portion to the second outermost portion of the first electrode to form an arithmetical progression having a common difference, wherein the distance between the first electrode tab Tn−2 placed at a third outermost portion of the first electrode and the first electrode tab Tn−1 placed at the second outermost portion of the first electrode is defined as (An−2), wherein the distance between the first electrode tab Tn−1 placed at the second outermost portion of the first electrode and the first electrode tab Tn placed at the outermost portion of the first electrode is defined as (An−1), and wherein the difference between the distance (An−2) and the distance (An−1) is greater than the common difference.

15. The electrode assembly of claim 14, wherein the distance (An−1) is about 1.5 times to about 4 times the greatest of the distances between two adjacent ones of the other first electrode tabs T1-Tn−1.

* * * * *